Figure 1:
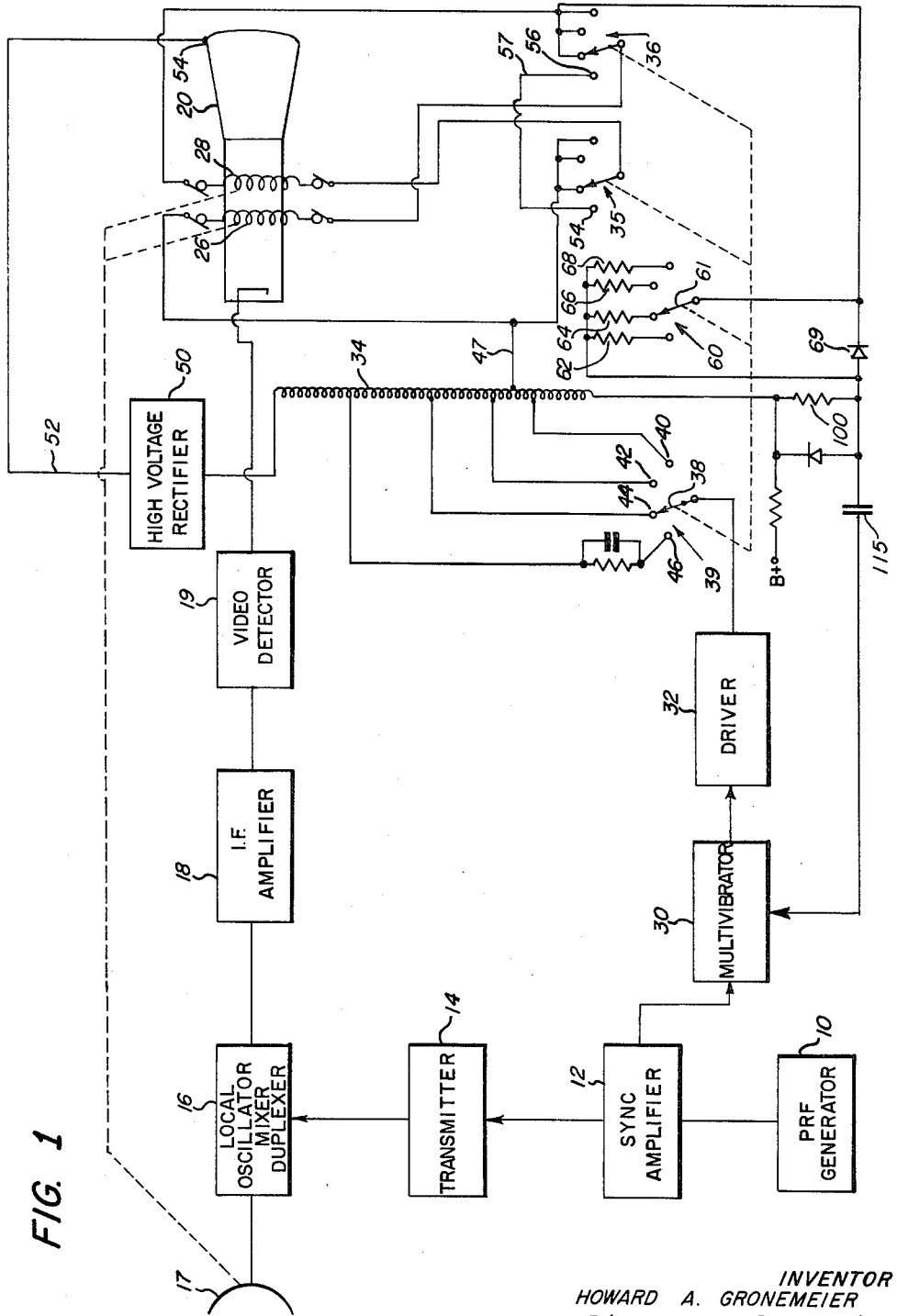

Nov. 23, 1965    H. J. GRONEMEIER    3,219,874
SWEEP AMPLITUDE CONTROL FOR DEFLECTION CIRCUIT
Filed Sept. 20, 1962    2 Sheets-Sheet 1

INVENTOR
HOWARD A. GRONEMEIER
BY Herbert W. Arnold
ATTORNEY

INVENTOR
HOWARD A. GRONEMEIER
BY Herbert W. Arnold
ATTORNEY

United States Patent Office 3,219,874
Patented Nov. 23, 1965

3,219,874
SWEEP AMPLITUDE CONTROL FOR
DEFLECTION CIRCUIT
Howard J. Gronemeier, Burlingame, Calif., assignor to
Raytheon Company, Lexington, Mass., a corporation
of Delaware
Filed Sept. 20, 1962, Ser. No. 225,040
5 Claims. (Cl. 315—27)

This invention relates to regulation circuits and, more particularly, to a circuit for regulating and recovering a portion of the energy applied to, and stored in, an inductive load, such as, for example, the sweep coils for producing deflection of the electron beam of a cathode ray tube.

Magnetic deflection systems for cathode ray devices, such as, for example, systems adapted for use in radar, heretofore required high deflection voltages and current buildup waveforms which change from range to range and impose difficult regulating problems on the power supply. Also, the high deflection currents reduce the life of the tube or tubes in the circuit, and the sweep drive waveform for applying a sawtooth wave of current to the windings of the deflection coils is, in general, critical as to its shape. This is particularly disadvantageous in so-called "flyback" circuits which rapidly cut off the sweep tube to generate a high voltage in a flyback inductance or transformer which may, for example, be applied to the second anode of the cathode ray device. In such instances, the input driving voltage waveform applied to the sweep drive tube is made to vary from range to range which causes a corresponding change in the sweep waveform, the sweep driving tube not being driven to complete conduction even on long ranges. With such arrangements, in which the sweep tube is not driven to complete conduction, variations in the input driving voltage or sweep drive tube performance may, unless critically controlled, cause variations in the output energy level at which the sweep drive tube is cut off and corresponding variations in the high voltage developed in the flyback transformer. In addition, when it is considered that the power required to deflect an electron stream of a cathode ray device is very small, it becomes apparent that such systems which require the accurate control of high deflection voltage and current waveforms are expensive and inefficient.

In accordance with the present invention, conservation of sweep energy and efficiency in operation is achieved by providing an inductive member in which sweep energy is stored and by changing the values of inductance of such member presented to the output of the sweep drive tube for different current rise times corresponding to changes in range so that the peak energy in the inductive member is maintained substantially constant. For example, energy stored in an inductive load is regulated for different magnitudes of inductance by changing the matching between a signal source and its load, such as by an adjustment of the turns ratio of a matching transformer or other matching element connected between the signal source and the load. Such arrangement allows the sweep drive tube to be driven to substantially the same degree of average conduction for all ranges. More particularly, the invention discloses a multi-tap matching transformer for changing the turns ratio with ranges to provide a change in current rise time in the associated deflection yoke, corresponding, for example, to a change in range. With this arrangement, substantially the same power is drawn from the power supply for all ranges and the deflection yoke deflects the electron beam through a constant angle.

The invention further provides a feedback circuit which measures the current rise in the inductive load and terminates the input signal thereto at a predetermined value of peak current in the deflection yoke. This arrangement permits the high voltage to remain constant in the presence of a change in current rise time in the deflection yoke occasioned by a change in range or variation in circuit parameters or voltages.

Figure 2:
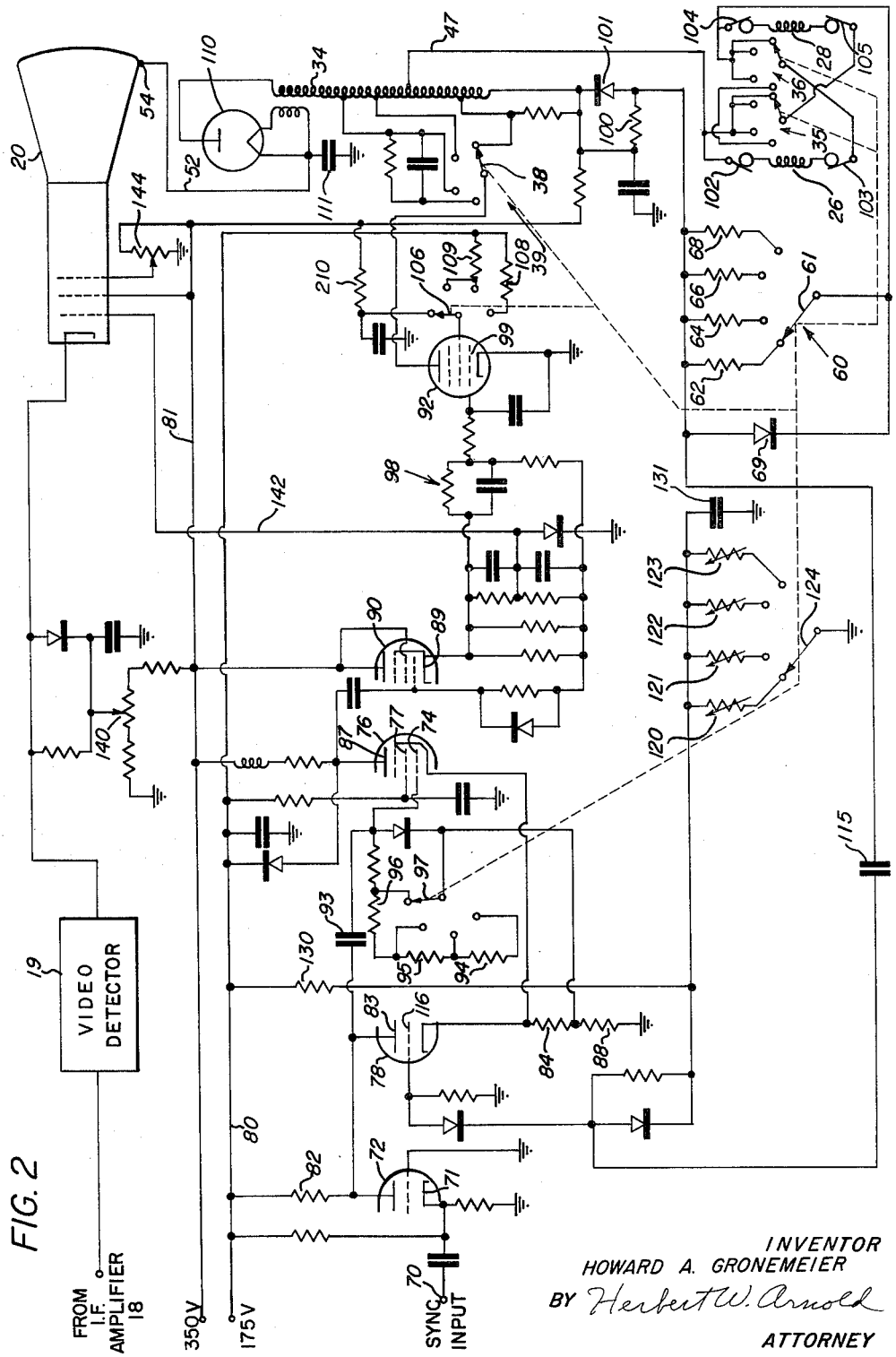

Other and further objects and advantages of this invention will become apparent, reference being had to the accompanying drawings wherein:

FIG. 1 illustrates a functional flow diagram of the pulse-echo radar system utilizing this invention; and FIG. 2 is a schematic diagram of the circuit details of a portion of the system illustrated in FIG. 1.

Referring now to FIG. 1, there is shown a pulse repetition frequency generator 10 whose output is fed to sync amplifier 12 and produces an output pulse suitable to drive a transmitter 14 which may comprise a magnetron oscillator, not shown. The output of transmitter 14 is fed through suitable microwave plumbing to a local oscillator duplexer-mixer section 16, which may be of any desired well-known type, and thence through suitable microwave plumbing to a directional antenna shown diagrammatically at 17 in accordance with well-known practice. The returning echo signals are received by antenna 17 and fed through the local oscillator duplexer-mixer section 16 to I.F. amplifier section 18. The I.F. amplifier 18 amplifies signals of the desired intermediate frequency which are produced by mixing local oscillator signals in section 16 with received echo signals in accordance with well-known practice. The I.F. amplifier 18 feeds detector and video amplifier 19, which, in turn, feeds cathode ray tube 20, which may be used as a conventional plan position indicator in which antenna 17 rotates in synchronism with deflection coils 26 and 28 positioned about the neck of the cathode ray tube 20.

Sync amplifier 12 also feeds a one-shot multivibrator 30 which produces a substantially square wave output having a time duration beginning approximately with the output pulse from the transmitter 14 and continuing in time duration for many times the duration of the transmitter output pulse. The output of multivibrator 30 is applied to a sweep driver tube 32, which, in connection with a multi-tap matching transformer 34, develops a sawtooth current wave in the sweep coils 26 and 28 by way of ganged yoke switches 35 and 36 and arm 38 of transformer range switch 39. This switch changes searching to any of four different ranges by applying a sweep drive to provide any of four separate voltages in transformer 34 to provide any of four separate currents in the deflection yoke coils 26 and 28. These ranges may be, for example, the one-half mile, two-mile, six-mile, and twelve-mile ranges, which is accomplished by switching the range switching arm 38 to contacts 40, 42, 44, and 46, respectively. Also connected to multi-tap transformer 34 is a high voltage rectifier device 50, the output of which is connected by way of lead 52 to the second anode terminal 54 of cathode ray tube 20.

In operation, a series of pulses of short duration are emitted from generator 10 with a pulse repetition frequency which may be, for example, on the order of 2000 pulses per second, thereby causing 2000 one-fifth microsecond microwave pulses to be emitted from the transmitter 14 and radiated from the antenna 17. A substantially square wave output is produced by multivibrator 30 for each pulse output from the transmitter, the time duration from the square wave output being any desired amount greater than the maximum range from which it is desired that the equipment will receive echo signals. For example, if the maximum range is to be twelve miles, the square wave should be greater than 150 microseconds.

In accordance with the invention, the multi-tap transformer 34 provides the dual function of supplying a high voltage of, for example, 10,000 volts to the second anode of cathode ray tube 20, and at the same time provides a square wave voltage output to deflection yokes 26 and 28. These yokes provide an inductive load circuit for driver stage 32 and transformer 34. In order to vary the rate of change of magnetic flux in said transformer, to control the output current in the deflection coils which normally require progressively faster rise times to achieve progressively shorter ranges of the associated radar circuit, an adjustment of the turns ratio of matching transformer 34 is achieved by feeding the charging current, normally produced by correction of driver stage 32, to a smaller number of turns on said transformer. For example, on the half-mile range, the sweep drive signal is fed to tap 40 and transformer 34 steps up the voltage applied across deflection coils 26 and 28. However, for other ranges, changes in the current rise time in the deflection yoke is achieved by taps 42, 44, and 46 feeding the drive signal transformer 34 to provide by transformer action a reduction in voltage across the deflection yokes 26 and 28. The current build-up in deflection yokes 26 and 28 terminates at substantially the same value to provide a PPI presentation of substantially the same size for each range. This is achieved by measuring the current in deflection yokes 26 and 28 by means of a voltage developed across resistor 100 connected in series in the deflection circuit and utilizing such voltage to terminate the square wave output multivibrator 30 and the sweep drive wave at a time in which the peak current in the deflection circuit does not exceed a predetermined value.

It should be noted that with a current rise time corresponding to the long range of twelve miles, deflection coils 26 and 28 are connected in series by means of taps 154 and 56 by a connecting lead 57. This is achieved in place of tapping contact 46 up substantially higher on transformer 34 and achieves optimum use of a particular number of transformer turns. Connected also to the deflection yoke coils 26 and 28 is a multi-tap switch 60 having an arm 61 to contact associated resistors 62, 64, 66, and 68 of values selected to provide, in connection with damping diode 69, the appropriate damping of the flyback voltage at the termination of the output of a multivibrator 30. For example, the time constant of these resistors in connection with the inductance of the deflection coils 26 and 28 is made progressively smaller on shorter ranges for appropriate damping when the multivibrator 30 is cut off at progressively shorter periods of time.

The matching achieved between the drive source 32 and the load presented by the deflection yokes in response to different turns ratios of matching transformer 34 permits substantially constant average power to be drawn from the power supply. By rectifying a portion of the inductive kick due to the power stored in the deflection yoke during the flyback interval, generation of high voltage for utilization, such as for brightness purposes, is achieved without the use of a separate supply normally required in a pulse radar system.

Referring now to FIG. 2, there is shown the circuit details of a portion of the system shown in FIG. 1.

A negative-going sync pulse, such as from sync amplifier 12 of FIG. 1, is applied at terminal 70 to the cathode 71 of grounded grid tube 72. This results in a negative-going pulse applied to the grid 74 of tube 76, which, in connection with tube 78, forms a one-shot timing multivibrator. Tube 78 is normally cut off. Plate voltage of 175 volts is supplied by way of lead 80 and plate load resistor 82 to the plate 83 of tube 78. Cathode bias resistors 84 and 88 develop cut-off bias for tube 78 as a result of current through tube 76. The application of a negative pulse to grid 74 causes tube 78 to conduct. The time of conduction depends upon the time constant of capacitor 93 and timing resistors 94, 95 and 96 in connection with selector arm 97, and maintains the bias voltage applied to grid 74 of tube 76 beyond cut-off. Non-conduction of tube 76 provides a positive-going square wave at its plate 87 which, by cathode follower action, appears at the cathode 89 of cathode follower tube 90. The duration of the positive-going square wave determines the duration of the square wave which is provided by driver tube 92 in driver stage 32. Conduction of tube 76 terminates the square wave output after a time determined by the value of timing capacitor 93 in connection with multivibrator timing resistors 94, 95, and 96 in connection with selector arm 97. Arm 97 is ganged to selector arm 61, as shown in FIG. 2, and selects different values of resistance for the different ranges selected.

The positive-going square wave output from cathode follower 90 is applied through a shaping network 98 to grid 99 of sweep drive tube 92. The positive-going square wave at grid 99 initiates conduction in sweep driver tube 92. The output or anode circuit of sweep drive tube 92 includes autotransformer 34, which is connected to the horizontal windings 26 and 28 of the deflection yoke of tube 20. The square wave voltage from the driver tube 92 generates a sawtooth current in the deflection yoke, which appears as a sawtooth voltage across series-connected resistor 100 and clipping diode 101. The output voltage is applied by transformer output lead 47 to deflection coils 26 and 28 by way of slip ring pairs 102–104, and 103–105. As noted, yoke switches 35 and 36 place deflection coils 26 and 28 in series on the twelve-mile range. Range switch 39 in the anode circuit of deflection tube 92 applies the approximately square wave output of tube 92 across the tap of autotransformer 34 which provides the desired deflection current build-up commensurate with the desired range. Arm 38 of range switch 39 is a make-before-break-type switch so as not to cause a momentary interruption in the current flow through the deflection tube 92 during a change in range. Switch 106 in the screen circuit of tube 92 is ganged to switch 39 and is a break-before-make-type, which prevent switching high currents in other portions of the circuit. Selector arms of switches 106, 39, 60 and yoke switches 35 and 36 are ganged by a mechanical linkage to select the same range, such as the one-half mile range shown in FIG. 2. Switch 106 changes the screen bias voltage on sweep driver tube 92 by means of the 175-volt source on lead 80 being fed to said screen through dropping resistors 108 and 109 and the 350-volt source on lead 81 being fed through dropping resistor 210. This limits the screen current to the level required for the particular range selected. At the completion of the sawtooth current wave which provides deflection of the beam of cathode ray tube 20, a sudden interruption of the current supplied through switch tube 92 to autotransformer 34 and to deflection windings 26 and 28 produces a high voltage pulse in transformer 34, which is rectified by a high voltage rectifier tube 110 and smoothing capacitor 111 prior to being fed to the second anode terminal 54 of cathode ray tube 20. This high voltage pulse is commonly called a "flyback pulse." Each of such pulses are transformed in amplitude from corresponding pulses produced at the anode of deflection tube 92 by means of the autotransformer action of transformer 34. The flyback pulses are, as noted, rectified by the diode action of tube 110 and the output circuit includes a condenser 111 which is a smoothing filter. With this arrangement, the current rise slope in the deflection yokes for different selections of taps on transformer 34 becomes more or less steep, depending upon the turns ratio applied by said transformer between the output of the sweep driver tube and the deflection yoke load for substantially the same voltage waveform output from the driver tube. For example, as noted, on a short range of one-half mile, the current build-up in the deflection yoke is purposely made substantially steep to provide the proper deflection within the shorter time required. The invention discloses a feedback circuit in which the voltage developed across resistor 100 is sampled and fed back by way of a capacitor 115 to override a preexisting bias level applied to the grid 116 of multivibrator tube 78. The pre-set bias level is determined for each range by means of grid bias resistors 120, 121, 122, and 123, which are selected by arm 124 and adjusted to provide a value of feedback voltage for termination of "knock off" at the proper time for each of the various ranges. This is achieved by providing a fixed bias level for the grid 116 by means of the voltage divider action of these adjustable sweep speed resistors in connection with resistor 130 and capacitor 131. By voltage divider action, these components set a predetermined bias level on the grid of 116. When the voltage appearing across resistor 100 overrides this bias level, tube 78 is caused to cut off, which shuts off the multivibrator and terminates the sweep current in the deflection yokes at substantially the same current level for each of the four ranges. In this manner, the high voltage applied to the rectifier 110 remains substantially constant, notwithstanding a change in range. Once the sweep has been terminated, the high voltage build-up commences in transformer 34 during the so-called "flyback period." To prevent oscillation in the flyback circuit, damping diode 69 is provided which, in connection with the inductance of the yokes 26 and 28, damping resistors 62, 64, 66, and 68 provide a negative cycle biting circuit to damp out oscillations which may occur during the flyback interval. The damping diode 69 is connected in the yoke circuit so as to be conductive in the opposite direction, that is, during the charging interval which produces the sweep current in the deflection coils 26 and 28. The negative-going "flyback current," is damped by diode 69 being nonconductive to this current and placing the inductance of the deflection yokes and damping resistors across the output of transformer 34. Intensity control in conjunction with a voltage applied to the intensity grid of tube 20 by way of lead 142 and focus potentiometer 144 are provided in accordance with well-known practice.

This invention is not limited to the particular details of construction, materials and processes described as many equivalents will suggest themselves to those skilled in the art. Accordingly, it is desired that this invention not be limited to the particular details of the embodiments disclosed herein except as defined by the appended claims.

What is claimed is:
1. In a voltage control circuit:
   an inductive load circuit;
   a generator for providing a sweep drive signal;
   a power supply circuit comprising a high voltage transformer coupled to said inductive load circuit;
   a switching circuit coupled to said generator connecting said sweep drive signal to said high voltage transformer for varying the rate of change of magnetic flux in said transformer to control the output current in said inductive load circuit;
   a feedback circuit connected to said power supply circuit for providing a feedback voltage;
   and means responsive to said feedback voltage to terminate said sweep drive signal to maintain current through said load circuit substantially constant notwithstanding a change in said switching circuit.

2. A current source means for providing a sweep drive signal;
   a load circuit including a deflection coil;
   a tapped transformer coupling said source means to said deflection coil;
   switching means for varying the rise time of current through said load circuit from said current source including means for introducing said sweep drive signal at different taps on said transformer;
   and detector means coupled to said load circuit for terminating said sweep drive signal at a predetermined current value in said deflection coil for providing an accelerating voltage.

3. The apparatus of claim 2 in which the sweep drive signal is derived from a multivibrator circuit which provides a rectangular waveshape signal.

4. The apparatus of claim 3 in which the detector means is coupled to said multivibrator circuit.

5. A current source means for providing a sweep drive signal;
   a load circuit including a deflection coil;
   a tapped transformer coupling said source means to said deflection coil;
   switching means for varying the rise time of current through said load circuit from said current source including means for introducing said sweep drive signal at different taps on said transformer;
   detector means coupled to said load circuit for terminating said sweep drive signal at a predetermined current value in said deflection coil for providing an accelerating voltage;
   and means for providing an accelerating voltage by rectifying the high voltage pulse produced in said transformer upon termination of said sweep drive signal.

References Cited by the Examiner
UNITED STATES PATENTS

| | | | |
|---|---|---|---|
| 2,797,359 | 6/1957 | Schroder | 315—27 |
| 2,829,304 | 4/1958 | Massman | 315—27 |
| 2,832,003 | 4/1958 | Andrieu | 315—27 |

DAVID G. REDINBAUGH, *Primary Examiner.*